United States Patent [19]

Ostertag et al.

[11] 4,237,318

[45] Dec. 2, 1980

[54] MANUFACTURE OF AQUEOUS METHANOLIC SOLUTION OF SODIUM FORMATE

[75] Inventors: Werner Ostertag, Gruenstadt; Gerd Wunsch, Speyer; Volker Kiener, Weisenheim; Eckhard Hetzel, Frankenthal; Siegfried Schreiner, Ludwigshafen; Bernd Leutner, Frankenthal; Hans-Ulrich Schlimper, Speyer; Erfried Voelkl, Frankenthal, all of Fed. Rep. of Germany

[73] Assignee: BASF Aktiengesellschaft, Fed. Rep. of Germany

[21] Appl. No.: 45,746

[22] Filed: Jun. 5, 1979

Related U.S. Application Data

[63] Continuation of Ser. No. 888,929, Mar. 22, 1978, abandoned.

[30] Foreign Application Priority Data

Apr. 9, 1977 [DE] Fed. Rep. of Germany .... P2716032

[51] Int. Cl.$^3$ ................. C01B 17/66; C07C 53/06
[52] U.S. Cl. ..................... 562/609; 423/515
[58] Field of Search ................. 423/515; 562/609

[56] References Cited

U.S. PATENT DOCUMENTS

| | | | |
|---|---|---|---|
| 2,281,715 | 5/1942 | Rogers | 562/609 |
| 3,262,973 | 7/1966 | Swaron | 562/609 |
| 3,714,340 | 1/1973 | Fujiwara et al. | 423/515 |

*Primary Examiner*—Jack Cooper
*Attorney, Agent, or Firm*—Keil & Witherspoon

[57] ABSTRACT

In a process for the manufacture of sodium dithionite by reacting sulfur dioxide with sodium formate and aqueous sodium hydroxide solution in the presence of methanol, an aqueous methanolic solution of sodium formate is first produced by reacting carbon monoxide with sodium hydroxide solution in an aqueous medium, containing from 1 to 50% by weight of methanol, based on the amount of water, at from 80 to 120° C. under a pressure of from 10 to 40 bars. The resulting aqueous methanolic solution can be reacted directly, in the conventional manner, with sulfur dioxide and aqueous sodium hydroxide solution to give sodium dithionite.

3 Claims, 1 Drawing Figure

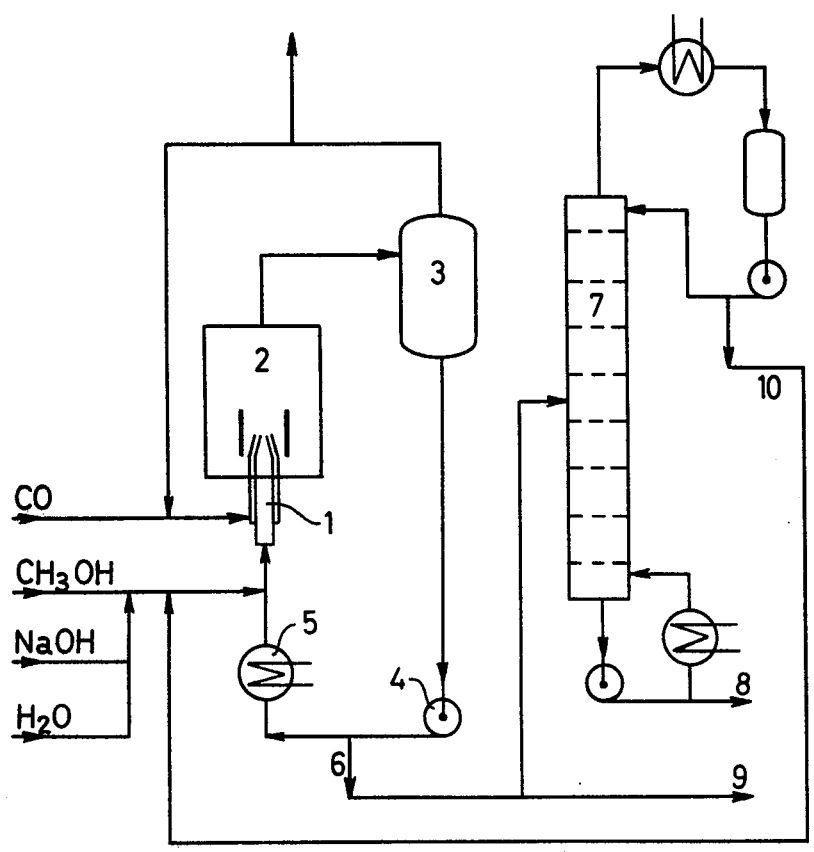

MANUFACTURE OF AQUEOUS METHANOLIC SOLUTION OF SODIUM FORMATE

This is a continuation, of application Ser. No. 888,929 filed Mar. 22, 1978 now abandoned.

In recent years, the manufacture of sodium dithionite by reducing sodium sulfite or sodium pyrosulfite with sodium formate has aroused increasing interest. The starting materials used are, in general, sulfur dioxide, sodium hydroxide solution and sodium formate, or mixtures of methyl formate and sodium hydroxide solution. The reaction can be represented by the following equation:

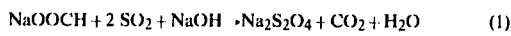

$$NaOOCH + 2\ SO_2 + NaOH \rightarrow Na_2S_2O_4 + CO_2 + H_2O \qquad (1)$$

As a rule, the reaction is carried out in aqueous solution or especially in aqueous alcoholic solution, especially in a methanol-water mixture.

The sodium formate required for the reaction is as a rule obtained by reacting sodium hydroxide solution with carbon monoxide in accordance with the equation

$$NaOH + CO \rightarrow HCOONa \qquad (2)$$

According to U.S. Pat. No. 2,281,715, the reaction is carried out in two stages, in the first of which carbon monoxide is reacted with aqueous sodium hydroxide solution at below 200° C. to a stage where the ratio of NaOH to sodium formate in the solution is at most 1:1. This solution is then brought together with a sodium formate melt and the reaction is completed at below 300° C. German Laid-Open Application DOS 2,436,979 describes a further process, in which an aqueous solution of sodium hydroxide is reacted with carbon monoxide at from 150° to 220° C. under a pressure of from 12 to 30 kg/cm². This process requires high temperatures and high pressures since otherwise the rate of reaction drops to an extent unacceptable in industrial practice. However, even if these high pressures and temperatures are used, the minimum residence time is still 30 minutes. A further disadvantage of the direct reaction of sodium hydroxide solution with carbon monoxide is that the reaction medium is highly corrosive under the conditions employed and for operation under these conditions the equipment must be manufactured from expensive materials if severe corrosion is to be avoided.

It has also been disclosed to avoid these disadvantages by carrying out the reaction of sodium hydroxide with carbon monoxide in an anhydrous medium, in the presence of methanol as the solvent (The Soviet Chemical Industry 5, No. 6, June 1973, pages 377-378). As disclosed in Russian Pat. No. 468,909, by the same author, the reaction can be carried out at from 95° to 115° C. under a pressure of from 15 to 25 kg/cm², and depending on the rate of introduction of gas, a residence time of as little as 18 seconds can be employed. The disadvantage of this process, which explains why it has not hitherto been employed industrially, is that the sodium formate produced by the reaction is virtually insoluble in methanol. Sodium formate is therefore deposited on the walls of the apparatus which are in contact with the reaction medium, and the reaction product can only be removed with difficulty from the reactor.

It is an object of the present invention to provide a process for the manufacture of sodium dithionite by reacting sulfur dioxide with sodium formate and aqueous sodium hydroxide solution in the presence of methanol, which is integrated with a process for the manufacture of sodium formate, which does not suffer from the above disadvantages and gives solutions of sodium formate which can be employed directly, in the conventional manner, for the manufacture of sodium dithionite.

We have found that this object is achieved by a process wherein carbon monoxide is reacted with sodium hydroxide solution in an aqueous medium which contains from 1 to 50% by weight of methanol, based on the amount of water, at from 80° to 120° C. under a pressure of from 10 to 40 bars, and the resulting aqueous methanolic solution of sodium formate is reacted in the conventional manner with sulfur dioxide and aqueous sodium hydroxide solution to give sodium dithionite.

Though the reaction medium consists predominantly of water, the advantages of the previously disclosed process for the manufacture of sodium formate in an anhydrous methanolic reaction medium are virtually completely realized in the process according to the invention, without incurring the disadvantages of the said process (namely the insolubility of sodium formate in methanol). Thus, if intensive gassing with CO is used, the reaction can be carried out rapidly and completely at a relatively low temperature, not exceeding 120° C. A further advantage is that the resulting aqueous methanolic solutions or aqueous solutions of sodium formate can be directly converted, in the conventional manner, to sodium dithionite by reaction with sulfur dioxide in the presence of sodium hydroxide solution.

The sodium hydroxide solutions employed are, advantageously, aqueous solutions which contain, based on the amount of water, from 60 to 80% by weight, preferably from 65 to 75% by weight, of sodium hydroxide, and from 1 to 50% by weight, preferably from 10 to 40% by weight, of methanol. The reaction is preferably carried out at from 90° to 110° C. under a pressure of from 10 to 30 bars.

The sodium formate solution obtained in this reaction is cooled, but advantageously only to the temperature at which the reaction with sulfur dioxide to give sodium dithionite is carried out; as a rule, the temperature for this latter reaction is from 60° to 90° C. Before converting the sodium formate solution to sodium dithionite, the methanol can be removed at least partially, for example by distillation.

The FIGURE illustrates an example of an installation wherein the process according to the invention can be carried out completely continuously.

The reactants, namely carbon monoxide, technical-grade sodium hydroxide solution, water and methanol, are introduced in the desired ratio, by means of an ejector 1 into a pressure reactor 2, where the reaction takes place under the above conditions.

To achieve the desired gassing intensity, both the carbon monoxide and the solution are circulated, i.e. carbon monoxide leaves the pressure reactor at the top and is returned to the gassing nozzle via a gas/liquid separator 3. The solution is circulated via the gas/liquid separator 3, a pump 4 and a heat exchanger 5.

The aqueous methanolic sodium formate solution is taken from the liquid mixing circuit at 6 and ca, if desired, be freed from methanol in column 7 and fed, via line 8, to a reactor, not shown in the Figure, for converting the solution to sodium dithionite. Alternatively, the solution taken off via line 6 can be fed directly, via line 9, to the dithionite reactor.

The methanol separated off in column 7 can be recycled to the stage in which sodium formate is produced.

EXAMPLE 1

70 g of methanol are added to 330 g of an aqueous sodium hydroxide solution containing 42.8% by weight of NaOH, and the mixture is heated at 100° C. in an autoclave made from corrosion-resistant Cr-Ni steel and packed with Raschig rings. Carbon monoxide under a pressure of 40 bars is then forced in, with vigorous shaking. 99.7% of the sodium hydroxide is converted to sodium formate (240 g) in less than 30 minutes.

Half of the sodium formate solution, cooled to 77° C., is placed in a heated stirred flask, into which 180 g of 50% strength by weight sodium hydroxide solution and 372 g of methanol are also introduced. This charge is kept at 77° C. and the other half of the sodium formate solution, prepared as above and cooled to 77° C., together with 200 g of $SO_2$ dissolved in 560 g of methanol, is introduced over 15 minutes, with constant stirring.

A further 100 g of $SO_2$, dissolved in 300 g of methanol, are then introduced over 30 minutes. The mixture is reacted for a further 2 hours at 77° C., with constant stirring.

The product is then filtered off, washed with an 80:20 (by weight) methanol/water mixture and dried.

The yield is 332 g of anhydrous crude dithionite, the crystals being 90% pure.

EXAMPLE 2

383 g of aqueous sodium hydroxide solution containing 37% by weight of pure sodium hydroxide are mixed with 95 g of methanol and then gassed intensively with carbon monoxide in an autoclave of corrosion-resistant Cr-Ni steel at 85°±3° C. under a pressure of 40 bars. After 35 minutes, 99.8% of the sodium hydroxide employed have been converted to sodium formate.

The solution is freed from methanol in a distillation column and half of the solution is then introduced into a heated stirred reactor. 90 g of sodium hydroxide, 30 g of water and 260 g of methanol are added. 140 g of sulfur dioxide and 430 g of methanol are added to the resulting suspension over 15 minutes, whilst ensuring that the temperature does not exceed 90° C. 160 g of sulfur dioxide and 485 g of methanol are then introduced over 50 minutes at from 70° to 80° C.

The second half of the aqueous sodium formate solution is added over 30 minutes beginning with the addition of the remaining sulfur dioxide and methanol.

The carbon dioxide formed during the reaction is taken off at a rate which ensures that the pressure in the stirred reactor does not exceed 1 atmosphere gauge. After completion of the introduction of the sulfur dioxide, the suspension is stirred for a further 2 hours at 80° C. to complete the reaction.

After filtering, washing with a mixture of methanol and water in the ratio of 8:2 by weight, and drying, 335 g of crude dithionite, which is more than 91% pure, are obtained.

We claim:

1. A process for the manufacture of an aqueous methanolic solution of sodium formate which solution can be used to produce anhydrous sodium dithionite which comprises: reacting carbon monoxide with an aqueous sodium hydroxide solution which contains based on the amount of water from 60 to 80% by weight of sodium hydroxide and from 10 to 40% by weight of methanol, at a temperature of from 80° to 120° C. under a pressure of from 10 to 40 bars.

2. The process of claim 1, wherein the reaction is carried out at from 90° to 110° C. under a pressure of from 10 to 30 bars.

3. The process of claim 2 wherein the aqueous solution of sodium hydroxide contains from 65 to 75% by weight of sodium hydroxide.

* * * * *

UNITED STATES PATENT AND TRADEMARK OFFICE
CERTIFICATE OF CORRECTION

PATENT NO. : 4,237,318
DATED : December 2, 1980
INVENTOR(S) : W. Ostertag, G. Wunsch, V. Kiener, E. Hetzel, S. Schreiner, B. Leutner, H. Schlimper, and E. Voelkl It is certified that error appears in the above—identified patent and that said Letters Patent is hereby corrected as shown below:

On the cover page, under U.S. Patent Documents, "Swaron" should read -- Swakon --.

On claim 1, line 28, a comma (,) should be inserted after "contains", and on line 29, a semicolon (;) should be inserted after "water".

Signed and Sealed this

Twenty-sixth Day of May 1981

[SEAL]

Attest:

RENE D. TEGTMEYER

*Attesting Officer*    *Acting Commissioner of Patents and Trademarks*